United States Patent
N et al.

(10) Patent No.: US 10,661,441 B2
(45) Date of Patent: May 26, 2020

(54) METHOD FOR REMOTELY ACCESSING A REMOTE DEVICE FROM A USER DEVICE VIA AN INTERMEDIATE DEVICE

(71) Applicant: HCL Technologies Limited, Noida (IN)

(72) Inventors: Satheesh N, Chennai (IN); Siva Sakthivel S, Chennai (IN)

(73) Assignee: HCL Technologies Limited (IN)

(*) Notice: Subject to any disclaimer, the term of this patent is extended or adjusted under 35 U.S.C. 154(b) by 22 days.

(21) Appl. No.: 15/888,975

(22) Filed: Feb. 5, 2018

(65) Prior Publication Data

US 2018/0222054 A1  Aug. 9, 2018

(30) Foreign Application Priority Data

Feb. 6, 2017 (IN) .............................. 201711004320

(51) Int. Cl.
| | |
|---|---|
| *G06F 3/14* | (2006.01) |
| *B25J 9/16* | (2006.01) |
| *G06F 3/16* | (2006.01) |
| *H04N 5/225* | (2006.01) |
| *H04N 5/232* | (2006.01) |

(52) U.S. Cl.
CPC ............. *B25J 9/1689* (2013.01); *B25J 9/161* (2013.01); *B25J 9/1697* (2013.01); *G06F 3/1454* (2013.01); *G06F 3/167* (2013.01); *H04N 5/225* (2013.01); *G05B 2219/35458* (2013.01); *G05B 2219/40269* (2013.01); *H04N 5/23206* (2013.01); *H04N 5/23299* (2018.08); *Y10S 901/47* (2013.01)

(58) Field of Classification Search
CPC ........ B25J 9/1689; B25J 9/161; B25J 9/1697; G06F 3/1454; G06F 3/167; H04N 5/225
USPC ........................................................ 709/227
See application file for complete search history.

(56) References Cited

U.S. PATENT DOCUMENTS

| | | | |
|---|---|---|---|
| 5,379,409 A | 1/1995 | Ishikawa | |
| 8,595,321 B2 | 11/2013 | Hoang et al. | |
| 9,313,602 B2 | 4/2016 | Sandler et al. | |
| 2007/0130289 A1* | 6/2007 | Defazio .............. | G06F 21/6218 709/218 |

(Continued)

OTHER PUBLICATIONS

Department of Computer Science, Columbia University "Application and Desktop Sharing" retrieved date Feb. 1, 2018.

*Primary Examiner* — Glenford J Madamba
(74) *Attorney, Agent, or Firm* — HM Law Group LLP; Vani Moodley, Esq.

(57) ABSTRACT

Disclosed is a Hybrid Remote Access Device (HRAD) for facilitating a user to remotely access a remote device from a user device. Initially, the HRAD transmits an access request, received from a user device, to the remote device. Upon transmitting the access request, the HRAD forwards an acknowledgment message to the user device upon receipt of the acknowledgment message from the remote device. After forwarding the acknowledgement message, the HRAD receives at least one of an audio-visual request and a control command from the user device. Subsequently, the HRAD transmits the stream of audio-visual input, being captured, to the user device, when the audio-visual request is received from the user device. The HRAD further performs an output action on the remote device, when the control command is received from the user device.

9 Claims, 5 Drawing Sheets

(56) References Cited

U.S. PATENT DOCUMENTS

| | | | |
|---|---|---|---|
| 2012/0212609 A1* | 8/2012 | Willis | H04N 5/23206 348/143 |
| 2014/0201400 A1* | 7/2014 | Beel | G06F 3/04842 710/63 |
| 2018/0093133 A1* | 4/2018 | Decarlo | A63B 69/36 |

* cited by examiner

METHOD FOR REMOTELY ACCESSING A REMOTE DEVICE FROM A USER DEVICE VIA AN INTERMEDIATE DEVICE

CROSS REFERENCE TO RELATED APPLICATIONS

This present application claims benefit from Indian Complete Patent Application No 201711004320 filed on 6 Feb. 2017, the entirety of which is hereby incorporated by reference.

TECHNICAL FIELD

The present subject matter described herein, in general, relates to a method and system for facilitating a user to remotely access a remote device from a user device. More specifically, the method and the system for facilitating remote access of the remote device via a Hybrid Remote Access Device (HRAD).

BACKGROUND

In an era of Information Technology (IT), it becomes probable to perform various activities on a computing system remotely without being at the actual location. A very common example for remote access is the online support providers who provide the means to remotely access and control customers' computer systems. This eliminates the need for support staff to physically travel onsite to address a problem, thereby minimizing delay in response time. Conventionally, the remote access may be achieved by installing a dedicated software on both the computer system, to be accessed remotely, as well as the system which facilitates to access the computer system remotely.

However, not every user has the administrator privileges to install the software and thus may not facilitate the support staff to access the computer system remotely. In addition to the above, network restrictions may also disallow the support staff to access the computer system remotely. Thus, in view of the above, it becomes challenging for the support staff to access the computer system remotely and hence may not be able to appropriately provide the support, from the remote location, as required.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for facilitating a user to remotely access a remote device from a user device via a Hybrid Remote Access Device (HRAD) and the concepts are further described below in the detailed description. This summary is not intended to identify essential features of the claimed subject matter nor is it intended for use in determining or limiting the scope of the claimed subject matter.

In one implementation, a Hybrid Remote Access Device (HRAD) for facilitating a user to remotely access a remote device from a user device is disclosed. In one aspect, the HRAD comprising a processor and a memory coupled to the processor. The processor is capable of executing a plurality of modules stored in the memory. The plurality of modules comprises a screen sharing module and a control input module. The screen sharing module transmits an access request, received from a user device, to a remote device. The access request may be transmitted for remotely accessing the remote device by the user device via the HRAD. The screen sharing module further forwards an acknowledgment message to the user device upon receipt of the acknowledgment message from the remote device. In one aspect, the acknowledgment message may indicate successful connection establishment of the user device with the remote device via the HRAD. Upon forwarding the acknowledgment message, the screen sharing module may further receive an audio-visual request from the user device to capture a stream of audio-visual input of the remote device. The stream of audio-visual input may comprise activities being performed on an output means of the remote device. The screen sharing module may further receive a control command, from the user device, pertaining to at least one of an input means and a robotic arm. In one aspect, the input means and the robotic arm may be coupled with the remote device to perform a respective output action on the remote device.

In another implementation, a method for facilitating a user to remotely access a remote device from a user device characterized by accessing the remote device via a Hybrid Remote Access Device (HRAD) is disclosed. In order to facilitate the user to remotely access the remote device, initially, an access request, received from a user device, may be transmitted to the remote device. In one aspect, the access request may be transmitted for remotely accessing the remote device by the user device via the HRAD. Upon transmitting the access request, an acknowledgment message may be forwarded to the user device upon receipt of the acknowledgment message from the remote device. In one aspect, the acknowledgment message may indicate successful connection establishment of the user device with the remote device via the HRAD. After forwarding the acknowledgement message, at least one of an audio-visual request and a control command may be received from the user device. The audio-visual request may be received to capture a stream of audio-visual input of the remote device. In one aspect, the stream of audio-visual input may comprise activities being performed on an output means of the remote device. The control command, on the other hand, may be received pertaining to at least one of an input means and a robotic arm. In one aspect, the input means and the robotic arm may be coupled with the remote device to perform a respective output action on the remote device. Subsequently, the HRAD may transmit the stream of audio-visual input, being captured, to the user device based on the audio-visual request, when the audio-visual request is received from the user device. The HRAD may further perform an output action on the remote device by at least one of the input means and the robotic arm, when the control command is received from the user device. In one aspect, the output action may be performed by simulating the control command on at least one of the input means and the robotic arm thereby facilitating the user to remotely access the remote device from the user device via the HRAD.

In another implementation, a method for facilitating remote access of a remote device from a user device is disclosed. In order to facilitate the remote access, initially, an access request may be transmitted to a remote device via a Hybrid Remote Access Device (HRAD). In one aspect, the access request may be transmitted for remotely accessing the remote device by the user device via the HRAD. Upon transmitting the access request, an acknowledgment message may be received from the HRAD upon receipt of the acknowledgment message transmitted by the remote device to the HRAD. In one aspect, the acknowledgment message may indicate successful connection establishment of the user device with the remote device via the HRAD. After receipt of the acknowledgment message, at least one of an audio-visual request and a control command may be transmitted to the HRAD. In one aspect, the audio-visual request may be transmitted to the HRAD in order to capture a stream of audio-visual input of the remote device. The stream of audio-visual input may comprise activities being performed on an output means of the remote device. The control command pertaining to at least one of an input means and a robotic arm. In one aspect, the input means and the robotic arm may be coupled with the remote device to perform a respective output action on the remote device. After transmitting at least one of the audio-visual request and the control command, the user device enables the HRAD to transmit the stream of audio-visual input, being captured, to the user device based on the audio-visual request, when the audio-visual request is received from the user device. The user device further enables to perform an output action on the remote device by at least one of the input means and the robotic arm, when the control command is received from the user device. In one aspect, the output action may be performed by simulating the control command on at least one of the input means and the robotic arm thereby facilitating the remote access of the remote device from the user device. In one aspect, the aforementioned method for facilitating remote access of the remote device from the user device may be performed by a processor using programmed instructions stored in a memory.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The proposed system facilitates a user to remotely access a remote device from a user device via a Hybrid Remote Access Device (HRAD) is disclosed. It may be understood that the HRAD is an intermediate device. The HRAD is communicatively coupled with the user device as well as the remote device. In one aspect, the HRAD is an Ethernet device that may facilitate the user to take remote access of the remote device without installing any dedicated software on any of the user device and the remote device. In one embodiment, the HRAD has an Ethernet based hardware Universal Serial Bus (USB) input means simulator that simulates one or more commands being received from the user device. The HRAD may further be communicatively coupled with a robotic arm. The robotic arm facilitates to perform corresponding mechanical actions at the remote system based on the one or more commands.

In order to facilitate the user, of the user device, to remotely access the remote device, the user device transmits an access request to the HRAD. The HRAD may then forwards the access request to the remote device. Upon receipt of the access request, the remote device transmits an acknowledgment message to the HRAD. Upon receipt of the acknowledgment message, the HRAD may then forwards the acknowledgment message to the user device. In one aspect, the acknowledgment message indicates successful connection establishment of the user device with the remote device via the HRAD. Once the user device receives the acknowledgment message, the user device transmits at least one of an audio-visual request and a control command to the HRAD in order to capture a stream of audio-visual input of the remote device and perform an output action on the remote device respectively.

The stream of audio-visual input comprises activities being performed on an output means of the remote device. The control command, on the other hand, comprises instructions to be provided to the robotic arm in order to perform respective output action on the remote device. Upon receipt of at least one of the audio-visual request and the control command, the HRAD transmits the stream of audio-visual input, being captured, to the user device based on the audio-visual request. In one aspect, the HRAD transmits the stream of audio-visual input when the audio-visual request is received from the user device. In one embodiment, upon receipt of the stream of the audio-visual input, if the user wishes to perform an output action, the HRAD may then perform the output action on the remote device by using at least one of the input means and the robotic arm. In one aspect, the output action may be performed when the control command is received from the user device. Thus, in this manner, the HRAD facilitates the user to remotely access the remote device from the user device.

While aspects of described system and method for HRAD for facilitating the user to remotely access the remote device from the user device and may be implemented in any number of different computing systems, environments, and/or configurations.

Figure 1A:
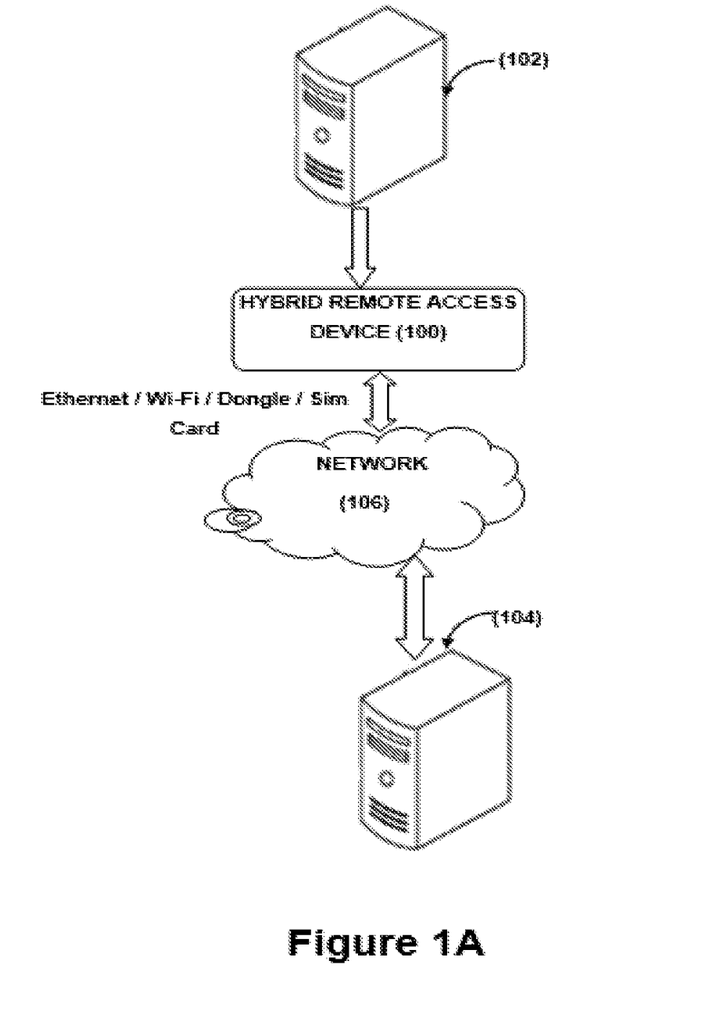
FIG. 1A illustrates a network implementation of a Hybrid Remote Access Device (HRAD) facilitating remote access to a single user to access a remote device, in accordance with an embodiment of the present subject matter.

Referring now to FIG. 1A, a network implementation of a Hybrid Remote Access Device (HRAD) 100 for facilitating a user to remotely access a remote device 102 from a user device 104 is disclosed. In order to facilitate the remote access to the user, initially, the HRAD 100 transmits an access request, received from a user device 104, to the remote device 102. Upon transmitting the access request, the HRAD 100 forwards an acknowledgment message to the user device 104 upon receipt of the acknowledgment message from the remote device 102. After forwarding the acknowledgement message, the HRAD 100 receives at least one of an audio-visual request and a control command from the user device 104. The audio-visual request may be received to capture a stream of audio-visual input of the remote device 102. In one aspect, the stream of audio-visual input may comprise activities being performed on an output means of the remote device 102. The control command, on the other hand, may be received pertaining to at least one of an input means and a robotic arm. Subsequently, the HRAD 100 transmits the stream of audio-visual input, being captured, to the user device 104 based on the audio-visual request, when the audio-visual request is received from the user device 104. The HRAD 100 further performs an output action on the remote device 102 by at least one of the input means and the robotic arm respectively, when the control command is received from the user device 104.

Figure 1B:
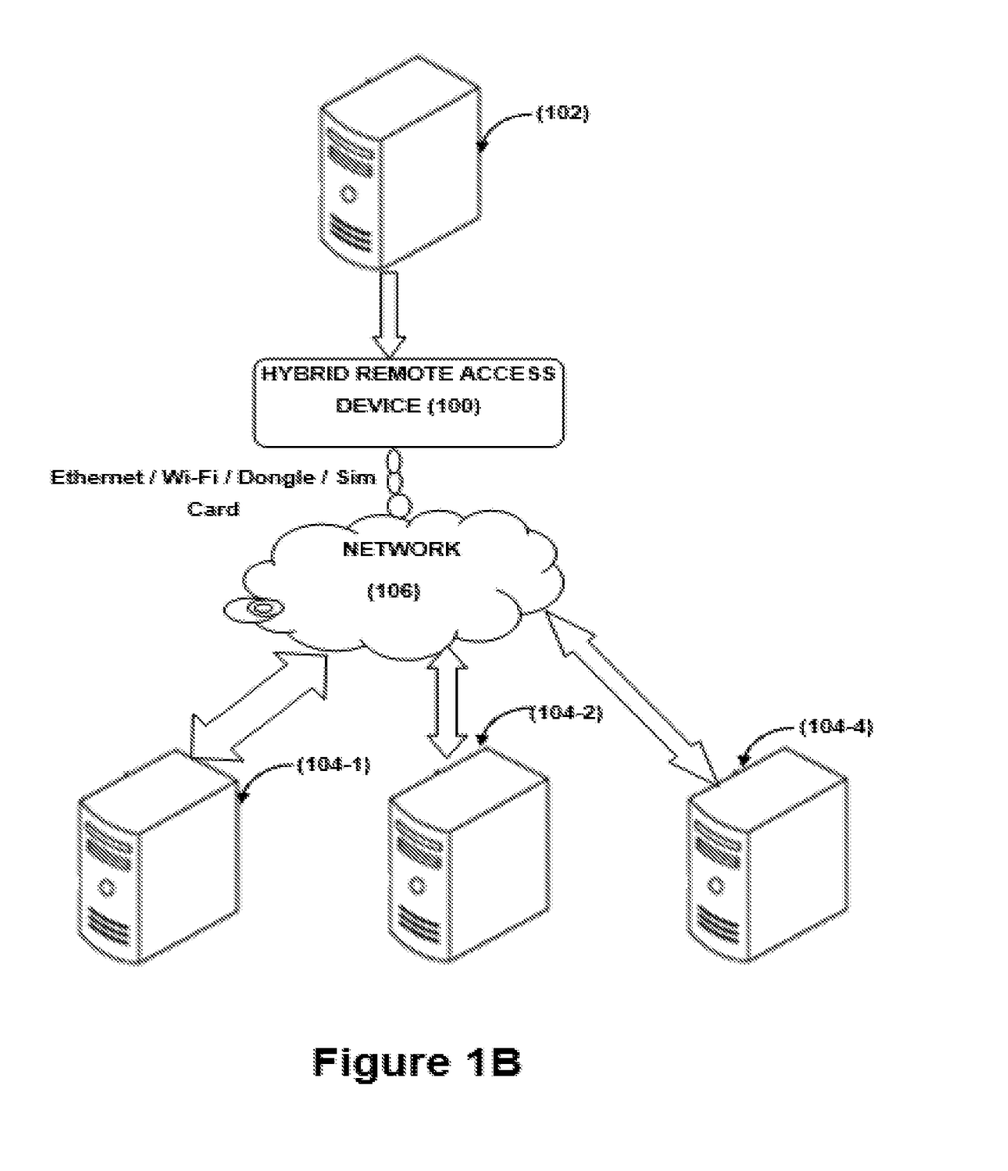
FIG. 1B illustrates a network implementation of a HRAD facilitating remote access to a plurality of user to access a remote device, in accordance with an embodiment of the present subject matter.

It may be understood that the present disclosure is explained considering that the HRAD 100 is implemented on a variety of computing systems, such as an Ethernet device that may facilitate the user to take remote access of the remote device without installing any dedicated software on any one of the user device 104 and the remote device 102. In one embodiment, the HRAD 100 has an Ethernet based hardware Universal Serial Bus (USB) input means simulator that simulates one or more commands being received from the user device 104. It may be understood that the HRAD 100 may also be implemented on other computing system including a mainframe computer, and a server. It will be understood that the remote device 102 may be accessed, via the HRAD 100, by multiple users through one or more user devices 104-1, 104-2 . . . 104-N, collectively referred to as the user device 104 as illustrated in the FIG. 1B. Examples of the user device 104 may include, but are not limited to, a portable computer, a personal digital assistant, a handheld device, a workstation, and other systems. The user device 104 are communicatively coupled to the HRAD 100 through a network 106.

In one implementation, the network 106 may be a wireless network, a wired network or a combination thereof. Further it may be understood that the network 106 may be a public network. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
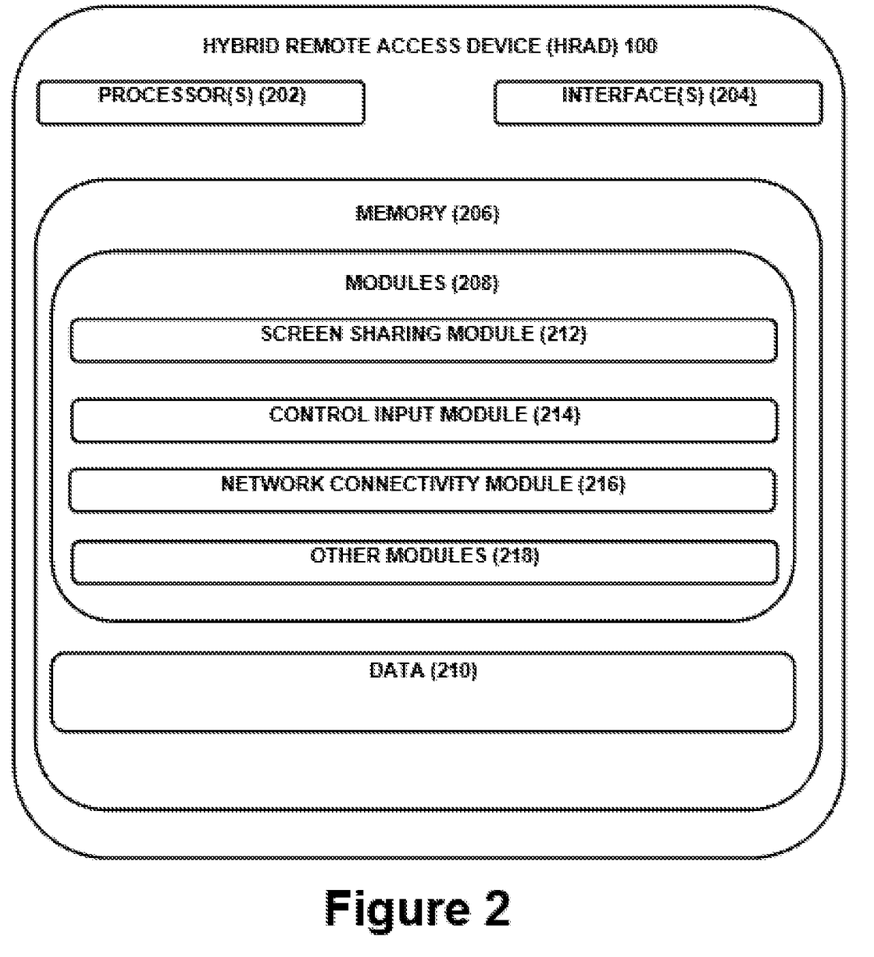
FIG. 2 illustrates the HRAD, in accordance with an embodiment of the present subject matter.

Referring now to FIG. 2, the Hybrid Remote Access Device (HRAD) 100 is illustrated in accordance with an embodiment of the present subject matter. In one embodiment, the HRAD 100 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the HRAD 100 to interact with the user directly or through the user device 104. Further, the I/O interface 204 may enable the HRAD 100 to communicate with other computing devices, such as web servers and external data servers (not shown). The I/O interface 204 can facilitate multiple communications within a wide variety of networks including, wired networks for example, LAN, cable, etc., and wireless networks, such as WLAN.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a screen sharing module 212, a control input module 214, a network connectivity module 216, and other modules 218. The data 210, amongst other things, serves as a repository for storing data processed, received, and generated by one or more of the modules 208.

Figure 3:
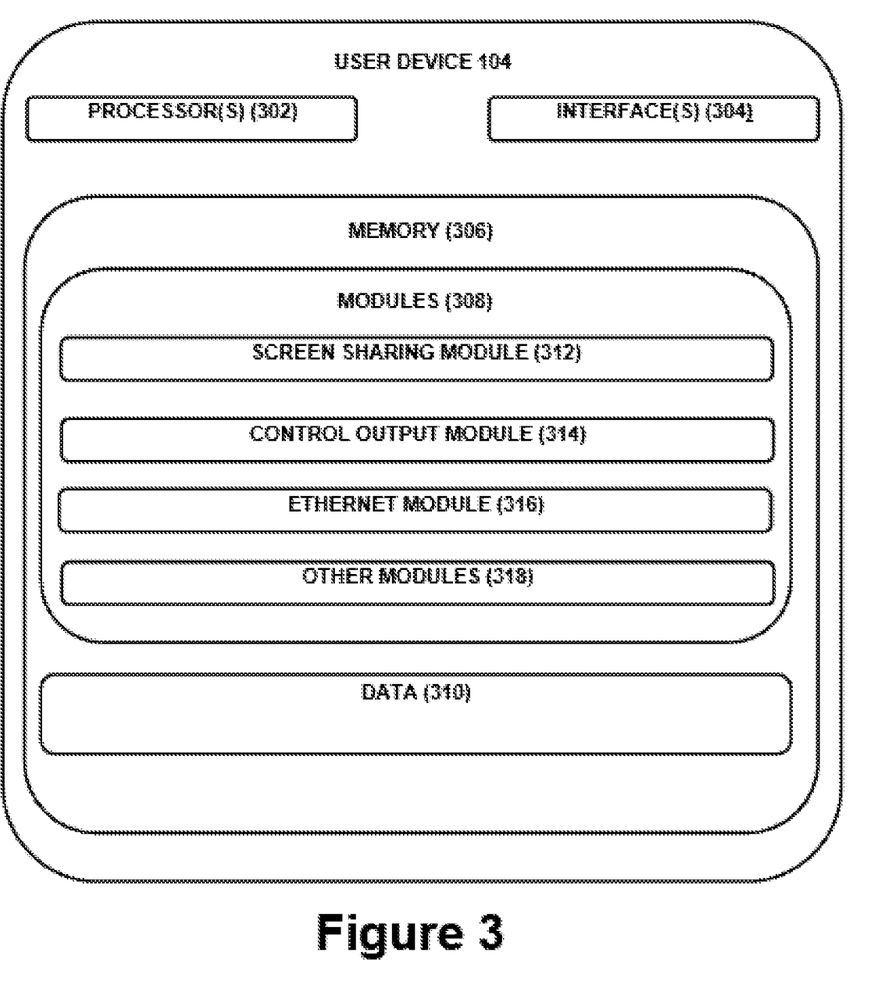
FIG. 3 illustrates a remote device, in accordance with an embodiment of the present subject matter.

Referring now to FIG. 3, the user device 104 is illustrated in accordance with an embodiment of the present subject matter. In one embodiment, the user device 104 may include at least one processor 302, an input/output (I/O) interface 304, and a memory 306. The at least one processor 302 may be implemented as one or more microprocessors, microcomputers, microcontrollers, digital signal processors, central processing units, state machines, logic circuitries, and/or any devices that manipulate signals based on operational instructions. Among other capabilities, the at least one processor 302 is configured to fetch and execute computer-readable instructions stored in the memory 306.

The I/O interface 304 may include a variety of software and hardware interfaces, for example, a web interface, a graphical user interface, and the like. Further, the I/O interface 304 may enable the user device 104 to communicate with other computing devices, such as web servers and external data servers (not shown). The I/O interface 304 can facilitate multiple communications within a wide variety of networks including, wired networks for example, LAN, cable, etc., and wireless networks, such as WLAN.

The memory 306 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 306 may include modules 308 and data 310.

The modules 308 include routines, programs, objects, components, data structures, etc., which perform particular tasks or implement particular abstract data types. In one implementation, the modules 308 may include a screen sharing module 312, a control output module 314, an Ethernet module 316, and other modules 318. The data 310, amongst other things, serves as a repository for storing data processed, received, and generated by one or more of the modules 308.

As there are various challenges observed in the existing art, the challenges necessitate the need to build the HRAD 100 for facilitating a user to remotely access a remote device 102 from a user device 104. In order to facilitate the remote access to the user, at first, a user may use the user device 104 to access the HRAD 100 in order to access the remote device 102. The HRAD 100 may employ the screen sharing module 212, the control input module 214, and the network connectivity module 216. The user device 104, on the other hand, may employ the screen sharing module 312, the control output module 314, and the Ethernet module 316. The detail functioning of the modules 208 and the modules 308, associated to the HRAD 100 and the user device 104 respectively, are described below with the help of figures.

Now referring to FIGS. 2 and 3. It may be understood that the HRAD 100 is an intermediate device that is communicatively coupled with the user device 104 as well as the remote device 102. In one aspect, the HRAD 100 is an Ethernet device that may facilitate the user to take remote access of the remote device 102 without installing any dedicated software on any of the user device 104 and the remote device 102. Further it may be understood that the HRAD 100 has an Ethernet based hardware Universal Serial Bus (USB) input means simulator that simulates one or more commands being received from the user device. In one aspect, the one or more commands may be received to perform an output action on the remote device 102. Example of the output action may include, but not limited to, inputting data, screen navigation, and installing software. The HRAD 100 may further be communicatively coupled with a robotic arm. The robotic arm facilitates to perform corresponding mechanical actions on the remote device 102 based on the one or more commands.

In order to remotely access the remote device 102 from the user device 104, the screen sharing module 312 (of the user device 104), transmits an access request to the HRAD 100. Upon receipt of the access request, the screen sharing module 212 (of the HRAD 100) further transmits the access request to the remote device 102. It may be understood that the access request may be transmitted by the user device 104 for receiving a stream of audio-visual input of the remote device or sharing the one or more commands to perform the output action on the remote device 102. In an exemplary embodiment, the HRAD 100 transmits the access request upon creating a User Datagram Protocol (UDP) socket for audio/video streaming and a Transmission Control Protocol (TCP) socket for command transmission.

Upon transmitting the access request, the screen sharing module 212 (of the HRAD 100) receives an acknowledgment message from the remote device 102 and subsequently forwards the acknowledgment message to the user device 104. The acknowledgment message transmitted by the screen sharing module 212 (of the HRAD 100) is received by the screen sharing module 312 (of the user device 104). In one aspect, the acknowledgment message indicates successful connection establishment of the user device 104 with the remote device 102 via the HRAD 100.

Upon receiving the acknowledgment message, the screen sharing module 312 (of the user device 104) transmits at least one of an audio-visual request and a control command to the screen sharing module 212 (of the HRAD 100). In one embodiment, the screen sharing module 212 (of the HRAD) further comprises a Video/Audio encoder and an Ethernet streamer (not shown in the figure). The Video/Audio encoder contains a stack for video/Audio encoder like H264, mpeg, Advanced Audio Coding (AAC), Mp3. The Ethernet streamer, on the other hand, contains a stack for network video streaming protocols like Real-time Transport Protocol (RTP)/Real Time Streaming Protocol (RTSP).

It may be understood that the audio-visual request may be transmitted to capture the stream of audio-visual input of the remote device 102. In one embodiment, the stream of audio-visual input of the remote device 102 may be captured by at least one of an image capturing unit, a video output port, and a microphone communicatively coupled with the remote device 102. It may be understood that the image capturing unit, the video output port, and the microphone are configure to capture the audio-visual input of the remote device 102. In one aspect, the stream of audio-visual input may comprise activities being performed on an output means of the remote device 102. Example of the output means may include a monitor or a display screen.

Upon receiving the audio-visual request, the control input module 214 enables the image capturing unit, the video output port, and the microphone to capture the audio-visual stream input, from the remote device 102. Upon capturing the stream of audio-visual input, the control input module 214 transmits the stream of audio-visual input, being captured, to the user device 104 based on the audio-visual request. In one aspect, the network connectivity module 216 transmits the stream of audio-visual input to the user device 104 by using a public network facilitated by one of a Universal Serial Bus (USB) Internet dongle, Wi-Fi and Global System for Mobile communication (GSM) SIM card. In one embodiment, upon receipt of the stream of audio-visual input, a Video/Audio encoder and Ethernet streamer decodes the stream of audio-visual input transmitted by the remote device 102 over the Ethernet. Upon decoding the stream of audio-visual input, the video/audio output audio and/or video is being played via software application and the audio through speaker output lines.

Subsequent to the receipt of the stream of audio-visual input, if the user of the user device 104 wishes to perform the output action (including, but not limited to, inputting data, screen navigation, and installing software) on the remote device 102, the control output module 314 transmits the control command to the control input module 214 in order to perform the output action on the remote device 102. In one aspect, the control command may be transmitted to at least one of the input means and the robotic arm to perform the output action. In one aspect, the input means and the robotic arm are communicatively coupled with the remote device 102 to perform a respective output action on the remote device 102. Examples of the input means may include, but not limited to, a keyboard and a mouse.

The control input module 214, upon receipt of the control command, may then performs the output action on the remote device 102 by at least one of the input means and the robotic arm. In one aspect, the control command may comprise a plurality of Ethernet packets. The plurality of Ethernet packets may be decoded by the HRAD 100 in order to determine a respective output action to be performed on the remote device 102. Based on the determination of the respective output action, at least one of an input means and the robotic arm performs a respective output action on the remote device 102. In order to perform the output action, the control command enables hard button and touch functionality by using at least one of the input means and the robotic arm. In one aspect, the output action may be performed by simulating the control command on at least one of the input means and the robotic arm. Thus, in this manner, the HRAD 100 facilitates the user to remotely access the remote device 102 from the user device 104.

Though the above description of the modules 208 and the modules 308 have been described for a scenario where the remote device 102 is accessed by only one user through the user device 104, as shown in the FIG. 1A. It may be understood that the description of the modules 208 and the modules 308 may be similarly implemented, as aforementioned, where a plurality of users wishes to access the remote device 102 through the user device 104, as shown in the FIG. 1B. It may be further understood that while the plurality of users is capable of accessing the remote device 102, it is necessary for the administrator or any super user, having all the access privileges, to configure a priority for the plurality of users. Upon such configuration, the HRAD 100 may accordingly processes at least one of the audio-visual request and the control command, received from the user device 104, based on the priority defined for each user.

Figure 4:
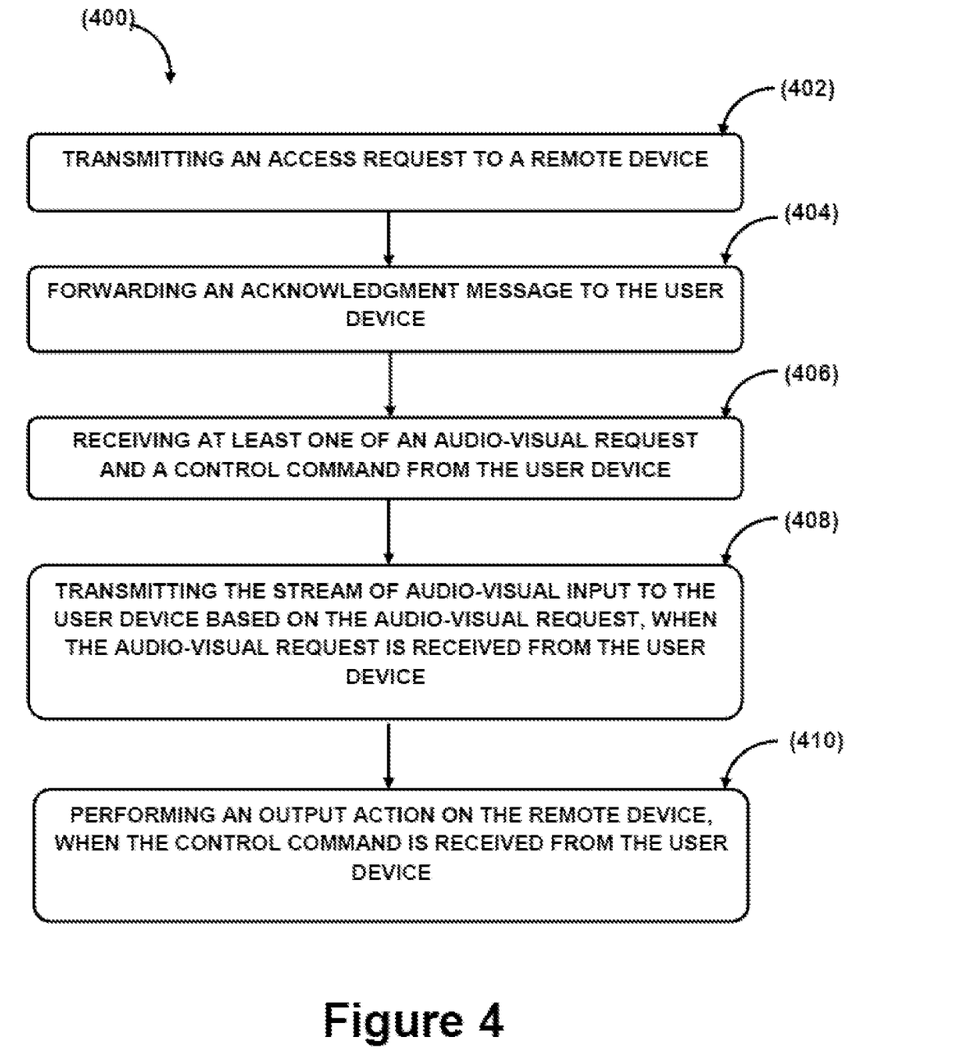
FIG. 4 illustrates a method for facilitating a user to remotely access a remote device from a user device via the HRAD, in accordance with an embodiment of the present subject matter.

Referring now to FIG. 4, a method 400 for facilitating remote access of a remote device 102 from a user device 104 via a Hybrid Remote Access Device (HRAD) 100 is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the HRAD 100.

At block 402, an access request, received from a user device 104, may be transmitted to a remote device 102. In one aspect, the access request may be transmitted for remotely accessing the remote device 102 by the user device 104 via the HRAD 100. In one implementation, the access request may be transmitted by the screen sharing module 212.

At block 404, an acknowledgment message may be forwarded to the user device 104 upon receipt of the acknowledgment message from the remote device 102. In one aspect, the acknowledgment message indicates successful connection establishment of the user device 104 with the remote device 102 via the HRAD 100. In one implementation, the acknowledgment message may be forwarded by the screen sharing module 212.

At block 406, an audio-visual request or a control command may be received from the user device 104. In one aspect, the audio-visual request may be received from the user device 104 to capture a stream of audio-visual input of the remote device 102. In one aspect, the stream of audio-visual input may comprise activities being performed on an output means of the remote device 102. The control command, on the other hand, may be received pertaining to at least one of an input means and a robotic arm. In one aspect, the input means and the robotic arm may be coupled with the remote device 102 to perform a respective output action on the remote device 102. In one implementation, the audio-visual request or a control command may be received by the screen sharing module 212.

At block 408, the stream of audio-visual input, being captured, may be transmitted to the user device 104 based on the audio-visual request. In one aspect, the stream of audio-visual input may be transmitted when the audio-visual request is received from the user device. In one implementation, the stream of audio-visual input may be transmitted by the control input module 214.

At block 410, an output action may be performed on the remote device 102 by at least one of the input means and the robotic arm, when the control command is received from the user device 104. In one aspect, the output action may be performed by simulating the control command on at least one of the input means and the robotic arm. In one implementation, the output action may be performed by the control input module 214.

Exemplary embodiments discussed above may provide certain advantages. Though not required to practice aspects of the disclosure, these advantages may include those provided by the following features.

Some embodiments enable a system and a method to access remote devices which has limited bandwidth, or no network/internet connectivity, or intermittent network/internet connectivity.

Some embodiments enable a system and a method to access remote devices that run under secured networks.

Some embodiments enable a system and a method to access remote devices where software installation is not feasible.

Although implementations for methods and systems for Hybrid Remote Access Device (HRAD) for facilitating a user to remotely access a remote device from a user device have been described in language specific to structural features and/or methods, it is to be understood that the appended claims are not necessarily limited to the specific features or methods described. Rather, the specific features and methods are disclosed as examples of implementations for facilitating the user to remotely access the remote device from the user device.

The invention claimed is:

1. A method for facilitating a user to remotely access a remote device from a user device characterized by accessing the remote device via a Hybrid Remote Access Device (HRAD), the method comprising:
transmitting, by a Hybrid Remote Access Device (HRAD), an access request, received from a user device, to a remote device, wherein the access request is transmitted for remotely accessing the remote device by the user device via the HRAD;
forwarding, by the HRAD, an acknowledgment message to the user device upon receipt of the acknowledgment message from the remote device, wherein the acknowledgment message indicates successful connection establishment of the user device with the remote device via the HRAD;
receiving, by the HRAD, at least one of
an audio-visual request from the user device to capture a stream of audio-visual input of the remote device, wherein the stream of audio-visual input comprises activities being performed on an output means of the remote device, and
a control command, from the user device, pertaining to at least one of an input means and a robotic arm, wherein the input means and the robotic arm are coupled with the remote device to perform a respective output action on the remote device; and
performing, by the HRAD, at least one of
transmitting the stream of audio-visual input being captured to the user device based on the audio-visual request, when the audio-visual request is received from the user device, and
performing an output action on the remote device by at least one of the input means and the robotic arm, when the control command is received from the user device, wherein the output action is determined by decoding a plurality of Ethernet packets from the control command, and wherein the output action is performed by simulating the control command on at least one of the input means and the robotic arm,
thereby facilitating the user to remotely access the remote device from the user device via the HRAD.

2. The method of claim 1, wherein the stream of audio-visual input of the remote device is captured by at least one of an image capturing unit, a video output port associated to the remote device, and a microphone.

3. The method of claim 1, wherein the control command enables hard button and touch functionality by using the robotic arm.

4. The method of claim 1, wherein the stream of audio-visual is transmitted to the user device by using a public network facilitated by one of a Universal Serial Bus (USB) Internet dongle, Wi-Fi and Global System for Mobile communication (GSM) SIM card.

5. A Hybrid Remote Access Device (HRAD) for facilitating a user to remotely access a remote device from a user device, the HRAD comprising:
a processor; and
a memory coupled to the processor, wherein the processor is capable of executing a plurality of modules stored in the memory, and wherein the plurality of modules comprising:
a screen sharing module for
transmitting an access request, received from a user device, to a remote device, wherein the access request is transmitted for remotely accessing the remote device by the user device via the HRAD;
forwarding an acknowledgment message to the user device upon receipt of the acknowledgment message from the remote device, wherein the acknowledgment message indicates successful connection establishment of the user device with the remote device via the HRAD;
receiving at least one of
an audio-visual request from the user device to capture a stream of audio-visual input of the remote device, wherein the stream of audio-visual input comprises activities being performed on an output means of the remote device, and
a control command, from the user device, pertaining to at least one of an input means and a robotic arm, wherein the input means and the robotic arm are coupled with the remote device to perform a respective output action on the remote device; and
a control input module for performing at least one of
transmitting the stream of audio-visual input being captured to the user device based on the audio-visual request, when the audio-visual request is received from the user device, and
performing an output action on the remote device by at least one of the input means and the robotic arm, when the control command is received from the user device, wherein the output action is determined by decoding a plurality of Ethernet packets from the control command, and wherein the output action is performed by simulating the control command on at least one of the input means and the robotic arm,
thereby facilitating the user to remotely access the remote device from the user device.

6. The HRAD of claim 5, wherein the stream of audio-visual input of the remote device is captured by at least one of an image capturing unit, a video output port associated to the remote device, and a microphone.

7. The HRAD of claim 5, wherein the control command enables hard button and touch functionality by using the robotic arm.

8. The HRAD of claim 5 further comprises a network connectivity module for transmitting the stream of audio-visual to the user device by using a public network facilitated by one of a Universal Serial Bus (USB) Internet dongle, Wi-Fi and Global System for Mobile communication (GSM) SIM card.

9. A method for facilitating remote access of a remote device from a user device, the method comprising:
transmitting, by a processor of a user device, an access request to a remote device via a Hybrid Remote Access Device (HRAD), wherein the access request is transmitted for remotely accessing the remote device by the user device via the HRAD;
receiving, by the processor, an acknowledgment message from the HRAD upon receipt of the acknowledgment message transmitted by the remote device to the HRAD, wherein the acknowledgment message indicates successful connection establishment of the user device with the remote device via the HRAD;
transmitting, by the processor, at least one of an audio-visual request to the HRAD in order to capture a stream of audio-visual input of the remote device, wherein the stream of audio-visual input comprises activities being performed on an output means of the remote device, and a control command, to the HRAD, pertaining to at least one of an input means and a robotic arm, wherein the input means and the robotic arm are coupled with the remote device to perform a respective output action on the remote device; and enabling, by the processor, the HRAD to transmit the stream of audio-visual input being captured to the user device based on the audio-visual request, when the audio-visual request is received from the user device, and perform an output action on the remote device by at least one of the input means and the robotic arm, when the control command is received from the user device, wherein the output action is determined by decoding a plurality of Ethernet packets from the control command, and wherein the output action is performed by simulating the control command on at least one of the input means and the robotic arm, thereby facilitating the remote access of the remote device from the user device.

* * * * *